Nov. 21, 1967 T. D. READER 3,353,732

BULK STORAGE TAPE FEED

Filed July 2, 1965 2 Sheets-Sheet 1

INVENTOR
TREVOR DRAKE READER

BY Thomas P. Murphy

AGENT

Nov. 21, 1967 T. D. READER 3,353,732

BULK STORAGE TAPE FEED

Filed July 2, 1965 2 Sheets-Sheet 2

United States Patent Office 3,353,732 Patented Nov. 21, 1967

3,353,732
BULK STORAGE TAPE FEED

Trevor D. Reader, King of Prussia, Pa., assignor to Sperry Rand Corporation, New York, N.Y., a corporation of Delaware Filed July 2, 1965, Ser. No. 469,206
16 Claims. (Cl. 226—97)

This invention relates to a tape feed system and more particularly to a tape feed system for feeding tape into and out of bulk storage tape loop boxes used in a tape transport system.

In a typical tape transport system tape is transported past a record-playback head. The tape is supplied from a supply reel on one side of the head and taken up or stored by a storage reel on the other side of the head. These reels wound with tape are large in size and mass and therefore the rate at which they may be accelerated from zero speed to playback or record speed is considerably less than the acceleration capable by the tape drive capstan which actually transports the tape past the record-playback head. Thus, when the tape transport system is energized, the capstan causes the tape to reach record or playback speed in a relatively short time compared to that time which is required by the take-up and supply reels to reach the record or playback speed. Thus, it is desirable to provide a free loop of tape between the supply reel and the tape drive capstan as well as a free loop of tape between the take-up reel and the record-playback area. With these free loops of tape the differences in acceleration rates between the tape drive capstan and the supply and take-up reels incident to starting, stopping and/or reversing the supply of tape through the record-playback area may be compensated. The free loops of tape make an excess of tape available to play out through the record-playback area during the time that the supply and take-up reels are catching up to the speed of the tape drive capstan without putting stress or tension on the tape which increases susceptibility to stretching or breaking. Furthermore, if the tape does not break under excessive tension, such tension may overload the system which is, of course, undesirable also.

One typical way of providing free loops of tape is to provide vacuum loop boxes wherein a single loop of tape is disposed and maintained under tension by means of a suction produced by a vacuum source communicating with the vacuum loop box at or near the bottom of the loop box. Since this type of loop box stores only a single loop of tape, the amount of tape which may be stored in a given box is limited and may be increased only by lengthening the loop box.

Another type of vacuum loop box presently in use is similar in structure to the loop box discussed above. In this type of loop box, however, the tape is interleaved or folded into a plurality of loops. In this way a great deal more tape may be stored in a given area than by the loop boxes discussed above.

A prime disadvantage associated with both of the types of loop boxes discussed above is the wear and tear on the tape as well as the loading of the system due to the friction produced by the tape rubbing against the vacuum loop box walls as it is fed into and out of the particular loop box. This friction is particularly undesirable where it is produced by the rubbing of the recorded side of the tape with any portion of the vacuum loop box since the recorded data may be destroyed.

The present invention contemplates a system for feeding tape into and out of a vacuum loop box of the second type which substantially eliminates frictional contact between the tape and the loop box and in particular eliminates frictional contact between the recorded side of the tape and the loop box at the areas where the tape enters and leaves the loop box.

More particularly the present invention contemplates a tape storage loop box and capstan arrangement for use in a tape transport system. The tape storage loop box is configured to receive and store tape in a plurality of overlapping folds. In a preferred embodiment the loop box of the present invention has a depth slightly greater than the width of the tape to be stored. The length and width of the loop box may be approximately equal. The loop box comprises an opening at one end which is equally divided into two parts by means of a partition which extends part way into the loop box.

A rotatable capstan is associated with and is partly disposed within each opening. Each capstan rotates about two stationary plenum chambers; each one of which extends about and communicates with approximately half the circumferential area bounding the outside surface of the capstan. One plenum chamber is adjacent the partition and is adapted to provide a suction to the tape when it is being fed into the loop box and a pressure when the tape is being fed out of the loop box. The other plenum chamber is on the opposite side of the capstan and functions to provide a positive pressure as an aid to removing the tape from the capstan when it is being fed into the loop box.

At least one nozzle connected to a source of pressure via a conduit is formed in the partition facing each capstan. Thus, when tape is being fed out of the loop box, positive pressure from the capstan and positive pressure from the nozzle provide films of air which guide the tape therebetween. This substantially eliminates frictional contact of the tape with the capstan and partition. The other opening of the loop box has another capstan associated therewith in the same manner.

Therefore, it is an object of the present invention to provide a tape feed system for feeding magnetic tape into and out of a loop box which substantially eliminates the frictional contact between the recording surface of the tape and the walls of the loop box.

A further object of the present invention is to provide a tape feed system for use in a tape transport system employing loop storage boxes wherein the tape entering the loop storage box is aided in assuming interleaving folds and the tape leaving the loop storage box is guided between two films of air thereby substantially eliminating frictional contact of the recording surface of the tape with the walls of the loop storage box particularly at the exit area.

Other objects and many of the attendant advantages of the present invention will become more apparent with the reading of the specification in conjunction with the drawings wherein.

Figure 1:
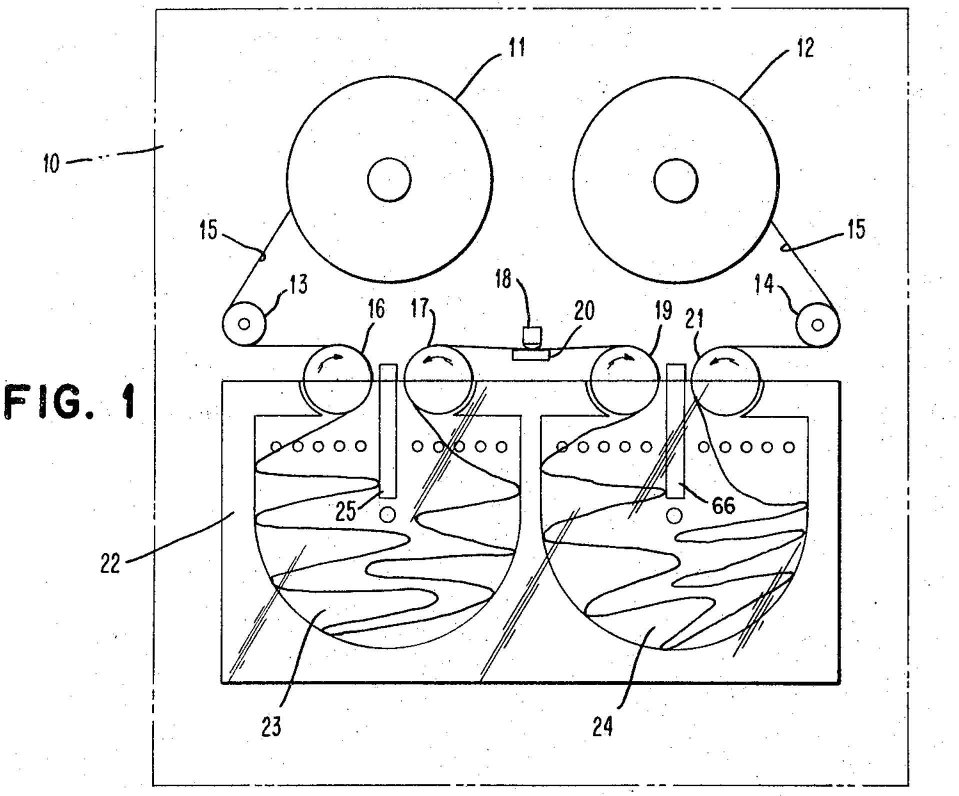
FIGURE 1 is a side elevational view of a magnetic tape transport system for transporting magnetic tape through a record-playback area of the general type utilizing the present invention.

Referring now more particularly to FIGURE 1 there is shown a frame member 10. Tape storage reels 11 and 12 are rotatably mounted to the frame member 10 in any suitable manner. Tape storage reels 11 and 12 are connected to reversible drive motors, respectively (not shown). The tape storage reel 11 functions generally as a supply reel while tape storage reel 12 functions as a take-up reel.

A structural member 22 is mounted on the frame member 10. Formed in the member 22 are loop boxes 23 and 24. Normally the member 22 has a cover plate for covering the loop boxes 23 and 24. For convenience in description this cover plate is left off. The loop boxes 23 and 24 have a depth slightly greater than the width of the tape 15. The length and width of each of the loop boxes 23 and 24 are substantially equal. The loop boxes 23 and 24 serve to store tape in overlapping folds substantially as shown. This method of tape storage permits storage of greater lengths of tape than the single loop type of loop storage box.

Partitions 25 and 66 equally divide the open ends of the loop boxes 23 and 24 into two openings. The partitions 25 and 66 have a depth equal to the depth of the loop boxes 23 and 24. The partitions 25 and 66 extend from just outside the loop boxes 23 and 24, respectively, to approximately one-third of the way into the loop boxes 23 and 24, respectively. Thus, the lower two-third portions of each of the loop boxes are not separated.

Each of the loop boxes further comprise a plurality of openings V on each side of the respective partitions 25 and 66. These openings are connected to a common source of vacuum (not shown).

The capstans 16, 17, 19 and 21 are rotatably mounted on frame member 10. Each of the capstans 16, 17, 19 and 21 are partially disposed within each of the openings of the loop boxes 23 and 24 substantially as shown in FIGURE 1. The structure of capstans 16, 17, 19 and 21 as well as their structural relationship to the loop storage boxes 23 and 24 is described more fully hereinbelow in reference to FIGURE 2.

Capstans 16, 17, 19 and 21 are connected to motors which continuously rotate them at the desired tape drive speed in the direction shown.

Freely rotatable guide rollers 13 and 14 are mounted on the frame member 10 in the positions shown in FIGURE 1.

A head 18 and support 20 are attached to the frame member 10 in any convenient manner. In operation the tape 15 passes between recording head 18 and the support 20. The guide roller 13 is positioned so that the tape 15 contacts the capstan 16 on a tangent parallel to the horizontal. The guide roller 14 is positioned so that the tape 15 contacts the capstan 21 on a tangent parallel to the horizontal. Depending on the direction of tape movement, the capstan 17 or the capstan 19 may act as the tape drive capstans. The manner in which the capstans actually engage and grip the tape for movement is discussed more fully hereinbelow in reference to FIGURE 2.

Figure 2:
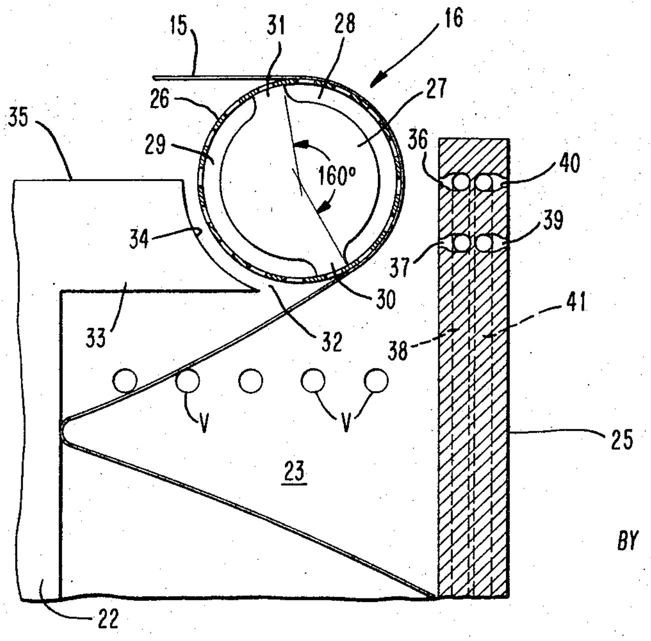
FIGURE 2 illustrates in close-up sectional view part of one of the loop boxes of FIGURE 1 with one of the two associated capstans being shown.

Referring now more particularly to FIGURE 2 there is shown in section a view of part of the loop box 23 including the capstan 16 and the partition 25.

Each of the capstans and partitions are identical in structure necessitating the description of only the capstan 16 and the partition 25. Capstan 16 comprises a hollow cylinder or drum 26 which rotates about a stationary inner member 27. The stationary inner member 27 has formed therein diametrically opposed plenum chambers 28 and 29. The plenum chambers 28 and 29 are separated from each other by means of projections 30 and 31 of the stationary inner member 27. These projections 30 and 31 are in rubbing relationship with the inner surface of the drum 26 and effectively fluid seal the plenum chambers 28 and 29 from each other. The drum 26 is perforated on its surface by a plurality of openings 32. Thus, the external surface of the drum 26 is maintained at the pressure of the particular plenum chamber 28 or 29 in the immediate vicinity of the associated segment of the drum 26.

The loop box 23 may comprise a lip portion 33 terminating in an arcuate surface 34 having substantially the same radius as the drum 26. The partition 25 extends upward slightly beyond the edge 35 of the lip 33.

The capstan 16 is disposed between the arcuate surface 34 and the partition 25 such that a line drawn through the axis of capstan 16 is substantially coincident with the edge

35. The plenum chamber 28 is so disposed within the capstan 16 that it begins at a point where the tape 15 coming from the guide roller 13 first contacts the outer periphery of the drum 26. The plenum chamber 28 extends around the inner periphery of the drum 26 approximately an arc of 160°. Thus, the plenum chamber 28 terminates at the projection 30 at a point well within the loop box 23.

The plenum chamber 29 is symmetrically disposed with respect to the plenum chamber 28. A portion of the plenum chamber 29 communicates with the external surface of the drum 26 that is exposed to the loop box 23. It should be noted that the plenum chamber 29 is made symmetrical to the plenum chamber 28 for convenience in construction. In practice it is necessary that only a portion of it be directly adjacent the loop box 23.

The present invention contemplates a source of positive pressure and a source of negative pressure. These sources of positive and negative pressure are alternately and selectively connectable to the plenum chamber 28 via appropriate valving arrangements. The positive source of pressure is selectively connectable to the plenum chamber 29.

When the tape is being fed into the loop box 23 from the reel 11, the vacuum source is connected to the plenum chamber 28 while the positive source of pressure is connected to the plenum chamber 29. Thus, the tape around the portion of the drum 26 within the vicinity of the plenum chamber 28 is gripped by means of a suction created by the vacuum within the plenum chamber 28. As the drum 26 rotates in the clockwise direction and the tape comes within the area of the drum 26 contiguous with the projection 30, the tape leaves the area of the drum and falls in folded arrays into the loop box 23.

Located within the loop box 23 and in the vicinity of the capstan 16 are ports or openings V which are coupled to the vacuum source. The vacuum from these ports functions firstly to remove the tape from the vicinity of the constantly rotating capstan 16 and secondly to further insure that the tape leaves the periphery of the capstan 16. Furthemore, the positive pressure within the plenum chamber 29 also aids in forcing the tape from the periphery of the drum 26 in the event the tape fails to leave the capstan freely.

The partition 25 has nozzles 36 and 37 formed therein, These nozzles may be selectively connected to a source of positive pressure through a conduit 38. The nozzle 36 faces the periphery of the capstan 16 such that a line bisecting the nozzle 36 passes through the axis of the capstan 16. This positioning of the nozzle 36 is not critical and it would suffice for purposes of this invention that the nozzle be placed in the approximate position shown. The nozzle 37 is placed so that it faces the periphery of the capstan 16 at a point slightly above the point where the tape 15 leaves the periphery of the capstan when the tape is being fed into the loop box 23.

When the tape is being withdrawn from the loop box 23 the plenum chamber 28 is connected to a positive source of pressure. The positive source of pressure is also connected to the nozzles 36 and 37. This creates two films of air. One film of air resides on the periphery of the capstan 16 and the other is along the adjacent wall of the partition 25 such that the tape 15 is guided between the air films as it leaves the loop box 23. Further, the tape is air borne on the upper portion of the periphery of the capstan 16. Thus, it can be seen that frictional contact of the tape 15, capstan 16 and the adjacent wall of the partition 25 is eliminated during the period in which the tape 15 is being fed out of the loop box 23. This is so, even though the capstan 16 is constantly rotating in the clockwise or opposing direction. Thus, frictional contact of the recorded side of the tape 15 and partition 25 on exit of the tape from loop box 23 is substantially eliminated.

In an alternate construction, not shown, the nozzle 37 may be tilted slightly downward with respect to the horizontal and periodically provided with a positive pressure as by periodically connecting it to the positive pressure source in order to aid in folding the tape as it leaves the capstan 16 and enters the loop box 23. The periodic air jets from the nozzle 37 could easily be determined by the speed of the tape and the result would cause some of the tape to be forced to the vicinity of the left wall of the loop box 23 while some portions of the tape would remain within the vicinity of the right wall of the loop box 23.

It should be noted that the partition 25 comprises a second pair of nozzles 39 and 40 selectively connectable to the positive source of pressure via conduit 41 similar to the nozzles 36 and 37. However, the second pair of nozzles face the capstan 17. The partition 66 also has two pair of nozzles with a pair facing a respective capstan 19 and 21.

Furthermore, it should be noted that the plenum chambers within the capstan 19 are located in a manner identical to those in the capstan 16 while the plenum chambers in the capstans 17 and 21 are identical in structure to those in the capstans 16 and 19 but reversed in position. Thus, when the tape moves from the tape reel 11 to the tape reel 12 past the recording head 18, the pressure at the surfaces of the capstans 16 and 19 in contact with the tape 15 is negative while the pressure at the surfaces of the capstans 17 and 21 in contact with the tape 15 is positive. Thus, in the left to right direction the speed of capstans 16 and 19 is transmitted to the tape 15. When the tape moves from the reel 12 to the reel 11, the pressures in capstans 16 and 19 and capstans 17 and 21 are reversed and the tape 15 is moved from right to left past the head 18 at the speed of capstans 17 and 21.

Actual tension in the tape 15 as it passes the recording head 18 is both a function of a vacuum in the loop boxes 23 and 24 and the drag created by the opposing motion of the capstan over which the tape is air borne.

While a separate drive capstan may be provided for actually driving the tape past the recording head in either direction, the tape drive function may be provided by the capstan 19 in the left to right direction and by the capstan 17 in the right to left direction with little modification.

Figure 3:
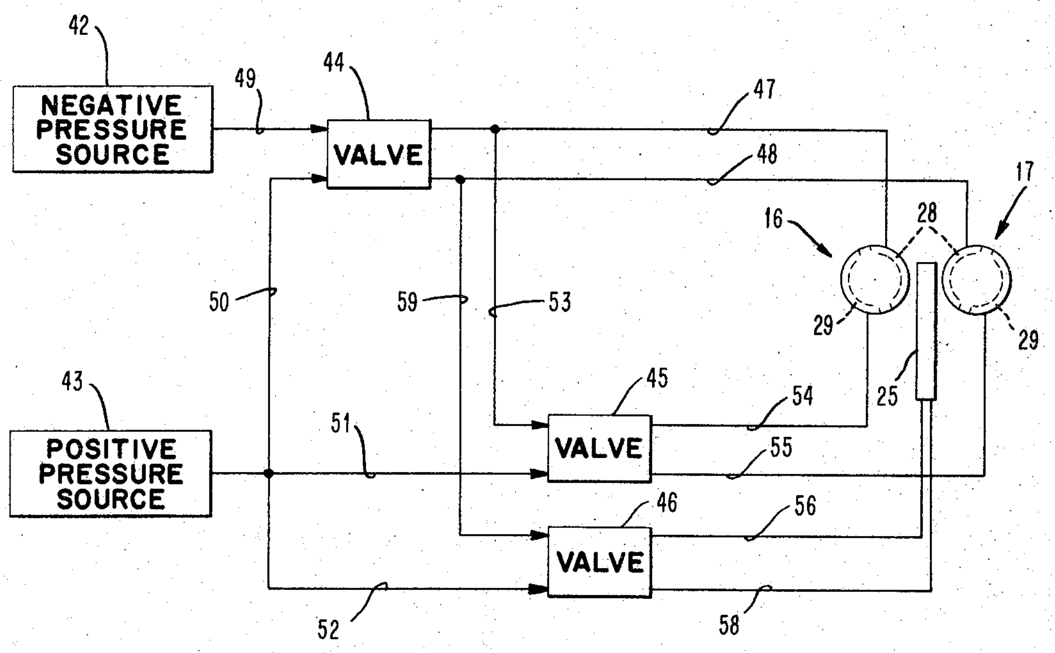
FIGURE 3 illustrates a pneumatic circuitry arrangement which may be used to supply the required pressures.

FIGURE 3 illustrates a pneumatic circuitry arrangement which may be used to supply the various plenum chambers of the capstans 16, 17, 19 and 21 as well as the various pairs of nozzles of the partitions 25 and 66 with the required pressures dependent upon the direction of the tape. For convenience of description the pneumatic circuitry arrangement is shown and described with respect to only capstans 16 and 17 and partition 25. However, since the capstans 19 and 21 are the exact counterparts to capstans 16 and 17, respectively, in actual practice the connections made to the capstan 16 are made to the capstan 19 while the connections made to the capstan 17 are made to the capstan 21. Likewise, it should be noted that the connection of positive pressure made to the nozzles 36 and 37 of the partition 25 are simultaneously made to the nozzles within the partition 66 facing the capstan 19. Similarly, when the positive pressure is connected to the nozzles 39 and 40 of the partition 25 the same connection is made to the nozzles facing the capstan 21 in the partition 66.

A source of negative pressure 42 and a source of positive pressure 43 are connected to a valve 44 by means of conduits 49 and 50, respectively. The valve 44 has a first output conduit 47 connected to the plenum chamber 28 of the capstan 16 and a second output conduit 48 connected to the plenum chamber 28 of the capstan 17. The valve 44 is a reversing valve of any conventional type which functions to connect the source of negative pressure 42 to the output conduit 47 and the source of positive pressure 43 to the output conduit 48 when it is in a first actuated position. When the valve 44 is in its second actuated position, the source of negative pressure 42 is connected to the output conduit 48 while the source of positive pressure 43 is connected to the output conduit 47.

In operation when the tape 15 is being transported from the left to right the output conduit 47 provides a negative pressure to the plenum chamber 28 of the capstan 16 while the output conduit 48 provides a positive pressure to the plenum chamber 28 of the capstan 17.

The source of positive pressure 43 is connected to a valve 45 by means of a conduit 51. The valve 45 is a reversible valve capable of connecting the source of positive pressure 43 to the output conduit 54 or the output conduit 55. The output channel 54 of the valve 45 is connected to the plenum chamber 29 of the capstan 16 while the output conduit 55 of the valve 45 is connected to the plenum chamber 29 of the capstan 17. The valve 45 is connected via the conduit 53 to the output conduit 47 of the valve 44 and it is responsive to a vacuum present in the output conduit 47 to automatically connect the source of positive pressure 43 to the plenum chamber 29 of the capstan 16 via the output conduit 54. When the output conduit 47 of the valve 44 has a positive pressure, the valve 45 is responsive to connect the source of positive pressure 43 to the plenum chamber 29 of the capstan 17 via the output conduit 55 of the valve 45.

The valve 45 may be one of the many commercially available valves which are actuated in response to pressure.

The source of positive pressure is connected to a valve 46 via the conduit 52. The valve 46 has a first output conduit 56 which is connected to the nozzles 36 and 37 of the partition 25 by means of the conduit 38 shown in FIGURE 1. The valve 46 has a second output conduit 58 connected to the nozzles 39 and 40 of the partition 25 via the conduit 41 shown in FIGURE 2. The valve 46 is identical to the valve 45 in function and is connected to the output conduit 48 of the valve 44 via the conduit 59. Thus, when the output conduit 48 has a positive pressure, the positive source of pressure 43 is connected to the nozzles 39 and 40 of the partition 25 via the output conduit 58. When the output conduit 48 has a negative pressure, the source of positive pressure 43 is connected to the nozzles 36 and 37 of the partition 25 via the conduit 56.

The valve 44 may be actuated manually when the tape changes direction or it may be made automatically responsive to the reversal of the direction of the tape for actuation.

When the tape is being transported in the left to right direction the pneumatic circuitry and valve arrangement just discussed functions to provide the plenum chamber 28 of the capstan 16 with negative pressure and the plenum chamber 29 of the capstan 16 with positive pressure while simultaneously providing the nozzles 39 and 40 of the partition 25 with positive pressure. Also during left to right transportation of the tape 15 the pneumatic circuit provides the plenum chamber 28 of the capstan 17 with positive pressure with no pressure being provided to the plenum chamber 29 of the capstan 17.

Thus, the tape entering the loop box 23 is gripped by the suction produced by the vacuum within the plenum chamber 28 of the capstan 16 while the tape exiting from the loop box 23 is air borne or guided between two films of air on the periphery of the capstan 17 and on the side of the partition 25.

When the direction of the tape is reversed and the tape is transported in the right to left direction, the valve 44 is automatically or manually reversed to supply negative pressure to the plenum chamber 28 of the capstan 17 and positive pressure to the plenum chamber 29 of the capstan 17 while simultaneously providing the plenum chamber 28 of the capstan 16 with positive pressure and the nozzles 36 and 37 of the partition 25 with positive pressure. Thus, the tape entering the loop box 23 is gripped by the capstan 17 and the tape exiting the loop box 23 is guided between films of air as it passes between the capstan 16 and the left side of the partition 25.

It should be noted that the tension of the tape would normally be maintained at a constant desired value. One method that could be used to accomplish this purpose would be to maintain the friction between the appropriate capstan and tape at a desired value and rotating the capstan at a speed at least equal to that of the tape. Providing the desired friction could be accomplished by controlling the suction provided by the capstans or utilizing a friction clutch with the capstan. This last method could eliminate slip of the tape relative to the capstans.

Obviously the apparatus of the present invention could be provided with appropriate sensing means to detect and control the amount of tape in each loop box.

The embodiments of the invention in which an exclusive property or privilege is claimed are defined as follows:

1. In a tape feed system, a vacuum loop box for storing tape in interleaving folds, said loop box having an open end, partition means equally dividing said open end into two openings, a capstan disposed in each opening, means associated with said capstans and said partition creating films of air on both sides of a tape which causes said tape to float therebetween as it passes between a selected capstan and said partition.

2. In a system for feeding tape into and out of a vacuum loop box, a first capstan disposed at the area of entry of the tape into the loop box feeding tape into said loop box, a second capstan disposed at the area of exit of the tape out of the loop box, a partition disposed in said vacuum box and further disposed between said capstans, means associated with said second capstan and said partition creating films of air on both sides of the tape at said area of exit.

3. In a system for feeding tape into and out of a vacuum loop box, a first continuously rotating capstan disposed at the area of entry of the tape into the loop box, a second continuously rotating capstan disposed at the area of exit of the tape out of the loop box, a partition disposed between said capstans, means associated with said second capstan and said partition creating films of air on both sides of the tape at said area of exit preventing physical contact of the tape with said second capstan and said partition, means associated with said first capstan at said area of entry creating a suction between the tape and said first capstan gripping the tape to said first capstan.

4. In a tape feed system, a vacuum loop box having an open end, partition means equally dividing said open end into two openings, each of said openings having a capstan disposed therein, each of said capstans comprising a rotatable hollow drum, a stationary plenum chamber surrounding slightly less than half of the internal periphery of said drum and facing said partition means, said drum having a plurality of perforations about its peripheral surface, said partition means including means for creating a film of air on the side facing a selected one of said capstans, means for providing fluid pressure to the plenum chamber of said selected capstan such that tape passing between said selected capstan and said partition is guided between two films of air.

5. In a tape feed system, a vacuum loop box having an open end, partition means equally dividing said open end into two openings, each of said openings having a capstan partially disposed therein on each side of said partition, each of said capstants comprising, a rotatable hollow drum, a stationary plenum chamber surrounding slightly less than half the internal periphery of said drum and facing said partition means, said plenum chamber beginning at the point of tangency of a horizontal line with the upper portion of said capstan, said drum having a plurality of perforations through its peripheral surface, means associated with said partition means for creating a film of air at the side of said partition means facing a selected one of said capstans, means for providing fluid pressure to the plenum chamber of said selected capstan such that tape exiting from said loop box between said selected capstan and said partition is guided between two films of air.

6. In a tape feed system, a vacuum loop box having an open end, partition means equally dividing said open end into two openings, each of said openings having a capstan partially disposed therein on each side of said partition, each of said capstans comprising, a rotatable hollow drum, a stationary plenum chamber surrounding slightly less than half the internal periphery of said drum and facing said partition means, said plenum chamber beginning at the point of tangency of a horizontal line with the upper portion of said capstan, said drum having a plurality of perforations through its peripheral surface, said partition means comprising first nozzle means facing one of said capstans and second nozzle means facing the other of said capstans, means for selectively providing fluid pressure to the plenum chamber of a selected one of said capstans and to the nozzle means facing said selected capstan whereby tape passing between said selected capstan and said partition is guided between two films of air.

7. In a tape feed system according to claim 6 wherein said first and second nozzle means of said partition means each comprise a first nozzle facing the middle portions of respective capstans and a second nozzle facing the lower portions of respective capstans.

8. In a tape feed system, a vacuum loop box having an open end, partition means equally dividing said open end into two openings, each of said openings having a capstan partially disposed therein on each side of said partition, each of said capstans comprising, a rotatable hollow drum, a stationary plenum chamber surrounding slightly less than half the internal periphery of said drum and facing said partition means, said plenum chamber beginning at the point of tangency of a horizontal line with the upper portion of said capstan, said drum having a plurality of perforations through its peripheral surface, said partition means comprising first nozzle means facing one of said capstans and second nozzle means facing the other of said capstan, means for selectively providing fluid pressure to the plenum chamber of one of said capstans and simultaneously a vacuum to the plenum chamber of the other of said capstans whereby tape passing between said one of said capstans and said partition is guided between two films of air and tape passing between said other of said capstans and said partition is gripped to the periphery of said other capstan.

9. In a tape feed system according to claim 8 wherein said first and second nozzle means of said partition means each comprise a first nozzle facing the middle portions of respective capstans and a second nozzle facing the lower portions of said respective capstans.

10. In a tape feed system according to claim 8 wherein said first and second nozzle means of said partition means each comprise a first nozzle facing the middle portions of respective capstans and a second nozzle facing the lower portions of said respective capstans, said second nozzle being inclined downward from the horizontal and being adapted to provide fluid pulses to the tape as it leaves a respective capstan to aid in folding the tape as it enters said loop box.

11. In a tape feed system, a vacuum loop box having an open end, a partition equally dividing said open end into two openings, an oppositely rotating capstan disposed in each of said openings on either side of said partition, each of said capstans comprising, a rotatable hollow drum, a first stationary plenum chamber surrounding slightly less than half the internal periphery of said drum and facing said partition, said first plenum chamber beginning at the point of tangency of a horizontal line with the upper portion of said capstan, a second stationary plenum chamber diametrically opposed to and symmetrical with said first plenum chamber, said drum having a plurality of perforations through its peripheral surface, means associated with said partition for creating a film of air at the side of said partition facing a selected one of said capstans, means for simultaneously providing fluid pressure to the first plenum chamber of said selected capstan and to the second plenum chamber of the other of said capstans and vacuum to the first plenum chamber of said other capstan whereby tape passing between said selected capstan and said partition is guided between two films of air and tape passing between said other capstan and said partition is gripped to the periphery of said other capstan.

12. In a tape feed system, a vacuum loop box having an open end, a partition equally dividing said open end into two openings, an oppositely rotating capstan disposed in each of said openings on either side of said partition, each of said capstans comprising, a rotatable hollow drum, a first stationary plenum chamber surrounding slightly less than half the internal periphery of said drum and facing said partition, said first plenum chamber beginning at the point of tangency of a horizontal line with the upper portion of said capstan, a second stationary plenum chamber diametrically opposed to and symetrical with said first plenum chamber, said drum having a plurality of perforations through its peripheral surface, said partition comprising first nozzle means facing one of said capstans and second nozzle means facing the other of said capstans, means selectively providing fluid pressure simultaneously to said first plenum chamber of one of said capstans, to said first nozzle, and to said second plenum chamber of the other of said capstans, and vacuum to said first plenum chamber of said other capstan or fluid pressure simultaneously to said first plenum chamber of said other capstans, to said second nozzle means, and to said second plenum chamber of said one capstan and vacuum to said first plenum chamber of said one capstan.

13. In a tape feed system according to claim 12 wherein said first and second nozzle means of said partition means each comprise a first nozzle facing the middle portions of respective capstans and a second nozzle facing the lower portions of said respective capstans.

14. In a tape feed system according to claim 13, wherein said first and second nozzle means of said partition means each comprise a first nozzle facing the middle portions of respective capstans and a second nozzle facing the lower portions of said respective capstans, said second nozzle being inclined downward from the horizontal and being adapted to provide fluid pulses to the tape as it leaves a respective capstan to aid in folding the tape as it enters said loop box.

15. In a tape transport system of the type utilizing tape reels which supply and take-up tape transported past a record-playback head, a vacuum loop box for storing tape in interleaving folds disposed between each tape reel and the record-playback head, a pair of oppositely rotating capstans associated with the open end of each of said vacuum loop boxes, a partition disposed between said pair of capstans and extending part-way into its respective loop box, each of said capstans having a stationary plenum chamber adjacent one side of its associated partition, means connecting said plenum chamber with the external peripheral surface of their respective capstans, each of said partitions comprising nozzle means facing said capstans, means selectively providing said plenum chamber and said nozzle means with positive pressure to create films of air on each side of said tape to guide said tape as it exits from each of said vacuum loop boxes, means selectively providing said plenum chamber with vacuum to create a gripping suction on the side of the tape adjacent said capstans when said tape is entering each of said loop boxes.

16. In a tape transport system comprising reels which supply and take-up tape as it is transported past a magnetic head, a vacuum loop box disposed between each tape reel and the magnetic head, a pair of oppositely rotating capstans disposed at the open end of each of said loop boxes, a partition disposed between said pair of capstans at each of said loop boxes and extending partially into the associated loop box, each of said capstans comprising a stationary plenum chamber adjacent one side of its associated partition, said plenum chamber communicating with the external peripheral surface of its associated capstan, each of said partitions comprising at least one nozzle facing each adjacent capstan, means selectively providing said plenum chamber and said nozzles with positive pressure to create films of air on each side of said tape to guide said tape between capstan and partition when said tape is exiting from said loop box, means selectively providing said plenum chamber with a vacuum to create a gripping suction on the side of the tape adjacent said capstans when said tape is entering each of said loop boxes, means associated with each capstan for removing said tape from the capstan as said tape enters the loop box, means associated with each of said loop boxes for folding said tape as it enters said loop boxes.

References Cited

UNITED STATES PATENTS

| | | | |
|---|---|---|---|
| 3,185,400 | 5/1965 | Maxey | 226—118 X |
| 3,195,791 | 7/1965 | Gwillim | 226—97 X |

M. HENSON WOOD, Jr., *Primary Examiner.*

R. A. SCHACHER, *Assistant Examiner.*